(12) United States Patent
Zhu et al.

(10) Patent No.: US 12,331,248 B2
(45) Date of Patent: Jun. 17, 2025

(54) MULTI-STABLE AND ERASABLE ANTI-COUNTERFEITING TECHNOLOGY WITH CONTROLLED REFLECTION COLOR AND APPLICATION THEREOF IN OPTICAL CODING

(71) Applicants: EAST CHINA UNIVERSITY OF SCIENCE AND TECHNOLOGY, Shanghai (CN); SUZHOU KUNHUANG NEW MATERIAL TECHNOLOGY CO., LTD., Suzhou (CN)

(72) Inventors: Weihong Zhu, Shanghai (CN); Zhigang Zheng, Shanghai (CN); Huijun Li, Shanghai (CN); Honglong Hu, Shanghai (CN)

(73) Assignees: EAST CHINA UNIVERSITY OF SCIENCE AND TECHNOLOGY, Shanghai (CN); SUZHOU KUNHUANG NEW MATERIAL TECHNOLOGY CO., LTD., Jiangsu (CN)

( * ) Notice: Subject to any disclaimer, the term of this patent is extended or adjusted under 35 U.S.C. 154(b) by 840 days.

(21) Appl. No.: 17/311,378

(22) PCT Filed: Oct. 12, 2020

(86) PCT No.: PCT/CN2020/120431
§ 371 (c)(1),
(2) Date: Jun. 7, 2021

(87) PCT Pub. No.: WO2021/232660
PCT Pub. Date: Nov. 25, 2021

(65) Prior Publication Data
US 2022/0335443 A1   Oct. 20, 2022

(30) Foreign Application Priority Data

May 19, 2020   (CN) .......................... 202010425456.8

(51) Int. Cl.
*G06Q 30/00*       (2023.01)
*C09K 9/02*        (2006.01)
*G06Q 30/018*      (2023.01)

(52) U.S. Cl.
CPC ........ C09K 9/02 (2013.01); *C09K 2211/1081* (2013.01); *C09K 2211/1092* (2013.01); *G06Q 30/0185* (2013.01)

(58) Field of Classification Search
CPC .............. C09K 9/02; C09K 2211/1081; C09K 2211/1092; G06Q 30/0185
See application file for complete search history.

(56) References Cited

U.S. PATENT DOCUMENTS

2006/0274230 A1* 12/2006 Shao ................. G02F 1/133516
430/7
2015/0141663 A1   5/2015 He et al.

FOREIGN PATENT DOCUMENTS

CN       1182114 A         5/1998
CN       1896779 A    *    1/2007
(Continued)

OTHER PUBLICATIONS

Markus Lahikainen, Kim Kuntze, Hao Zeng, Seidi Helantera, Stefan Hecht, and Arri Priimagi, Tunable Photomechanics in Diarylethene-Driven Liquid Crystal Network Actuators, ACS Applied Materials & Interfaces 2020, 12, 42, 47939-47947. (Year: 2020).*

(Continued)

*Primary Examiner* — Bijan Ahvazi
(74) *Attorney, Agent, or Firm* — Bochner PLLC; Andrew Bochner; Eric Kleinertz

(57) ABSTRACT

The present disclosure discloses a novel multi-stable and erasable anti-counterfeiting technology with controlled (Continued)

reflection color and the application thereof in optical coding. The method and use are characterized by high thermal stability and robust fatigue resistance, and the realization thereof relies on the material system composed of an intrinsic chiral diarylethene molecule based on steric hindrance ethene bridge and a liquid crystal (LC) material disclosed herein. The diarylethene based on steric hindrance ethene bridge has the following structural feature:

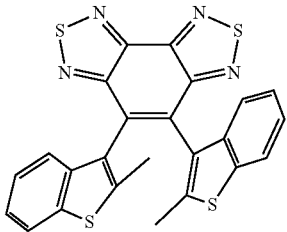

The material system composed of a diarylethene compound based on steric hindrance ethene bridge and an LC can be prepared by a simple preparation process from cheap raw materials, can achieve a wide spectral color adjustment range, and has excellent thermal stability and fatigue resistance, which is expected to be further widely used in the fields of dual erasable anti-counterfeiting and optical information encoding with high thermal stability and strong fatigue resistance.

4 Claims, 3 Drawing Sheets

(56) References Cited

FOREIGN PATENT DOCUMENTS

| CN | 101767511 A | 7/2010 |
|---|---|---|
| CN | 103625153 A | 3/2014 |
| CN | 105829283 A | 8/2016 |
| CN | 206833110 U | 1/2018 |
| CN | 108912842 A | 11/2018 |
| CN | 109868140 A | 6/2019 |
| CN | 209388588 U | 9/2019 |
| CN | 111423868 A | 7/2020 |

OTHER PUBLICATIONS

Irie, M., "Diarylethenes for Memories and Switches," Chem. Rev., vol. 100, Issue 5, pp. 1685-1716, Apr. 21, 2000.
Hirshberg, Y., "Reversible Formation and Eradication of Colors by Irradiation at Low Temperatures. A Photochemical Memory Model," J. Am. Chem. Soc., vol. 78, Issue 10, pp. 2304-2312, May 20, 1956.
Li, W. et al., "Separation of photoactive conformers based on hindered diarylethenes: efficient modulation in photocyclization quantum yields," Angew Chem Int Ed Engl., vol. 53, Issue 8, pp. 4603-4607, Apr. 25, 2014.
Cai, Y. et al., "Ferrocene-Grafted Photochromic Triads Based on a Sterically Hindered Ethene Bridge: Redox-Switchable Fluorescence and Gated Photochromism," Advanced Optical Materials, vol. 4, Issue 9, pp. 1410-1416, Sep. 2016.
Li, X. et al., "Theoretical insight into the enhanced hindrance, thermal stability and optical properties of diarylethene with a benzobis(thiadiazole) bridge and benzothiophene rings," Dyes and Pigments, vol. 125, pp. 348-355, Feb. 2016.
Jiben, M., "Five Application Areas of Photochromic Materials," Chemical Management, Issue 12, pp. 2, Dec. 31, 2012.
Li, W. et al., "Sterically hindered diarylethenes with a benzobis(thiadiazole) bridge: photochemical and kinetic studies," Journal of Materials Chemistry C, vol. 3, pp. 8665-8674, 2015.
English Translation of First Office Action mailed Jun. 13, 2022 in Chinese Counterpart Application No. 202010425456.8.

\* cited by examiner

MULTI-STABLE AND ERASABLE ANTI-COUNTERFEITING TECHNOLOGY WITH CONTROLLED REFLECTION COLOR AND APPLICATION THEREOF IN OPTICAL CODING

This application claims priority to Chinese patent application No. CN202010425456.8, filed to the China National Intellectual Property Administration (CNIPA) on May 19, 2020 and entitled "MULTI-STABLE AND ERASABLE ANTI-COUNTERFEITING TECHNOLOGY WITH CONTROLLED REFLECTION COLOR AND APPLICATION THEREOF IN OPTICAL CODING", which is incorporated herein by reference in its entirety.

TECHNICAL FIELD

The present disclosure relates to the field of anti-counterfeiting technologies and optical information encoding technologies, and especially in the field of multi-stable and erasable anti-counterfeiting technology with controlled reflection color and the application thereof in optical coding.

BACKGROUND

The development of science and technology makes it much easier for the anti-counterfeiting technologies to be forged. This makes it difficult for consumers to verify the authenticity of products. In order to achieve the anti-counterfeiting purpose for high-end, high value-added products, multiple anti-counterfeiting technologies are often combined in a complex manner to achieve multiple anti-counterfeiting protection. However, the process is difficult and costly, and the detection and identification are cumbersome. Therefore, there is an urgent need for a novel anti-counterfeiting technology with advantages of difficult to imitate, low cost in preparation, and easy to identify. The traditional holographic anti-counterfeiting technology has a fatal shortcoming, that is, it is easy to be overlaid by a template and thus loses its anti-counterfeiting function (CN201920257827.9). At present, the double-layer Moore optical structure technology is used on high-end, high-value-added commodities and banknotes due to its prominent anti-counterfeiting effect. This technology adopts a double-layer structure, where, a tiny pattern is made on the substrate. Then a layer of micro lens array is covered to observe the tiny pattern, thus realizing the anti-counterfeiting function. Although the technology is difficult to imitate, it is also difficult to prepare and low in efficiency, leading to significantly-increased production cost (CN201720709372.0). Compared with the holographic anti-counterfeiting technology and the double-layer Moore optical structure technology, photochromic compounds have attracted more and more attention in the field of anti-counterfeiting due to their advantages such as simple structure, easy preparation, and low cost. Moreover, excellent fatigue resistance and thermal stability are necessary in the application of information storage, encoding, switching and other devices (M. Irie. Chem. Rev., 2000, 100 (5): 1683-1683). Therefore, photochromic compounds with robust fatigue resistance and high thermal stability have huge potential in the application of information encoding devices.

Photochromism (Hirshberg Y. J. Am. Chem. Soc., 1956, 78: 2304) refers to reversible transformation of compounds accompanied by changes in structure, absorption spectrum, and color of the compound, that is, compound A transformed into compound B under the irradiation of light with a specified wavelength, and the compound B can be transformed into the initial state A under heating or the irradiation of the light with another specified wavelength. In recent years, organic photochromic compounds mainly include spiropyrans, azobenzenes, fulgides, and diarylethenes. The diarylethene system has gradually become a popular research direction due to its high thermal stability and robust fatigue resistance. Generally, azo (CN201210303520.0) and spiropyran (CN97120274.5) are used as anti-counterfeiting and optical information encoding materials, which perform poor thermal stability and fatigue resistance. Therefore, it is an urgent need to develop anti-counterfeiting and optical information encoding materials with highly stable, cheap, strongly fatigue-resistant, and easy to prepare.

SUMMARY

The present disclosure is intended to provide a multi-stable and erasable anti-counterfeiting technology with controlled reflection color and the application thereof in optical coding.

To achieve the above objective, the present disclosure adopts the following technical solutions:

A first aspect of the present disclosure provides a mixture of an intrinsic chiral diarylethene compound based on steric hindrance ethene bridge and a liquid crystal (LC) as an anti-counterfeiting material and applications thereof in the field of optical information encoding.

The intrinsic chiral diarylethene molecule based on steric hindrance ethene bridge shows the following structure formula:

1o

The anti-counterfeiting and optical information encoding materials may be made by mixing the intrinsic chiral diarylethene compound based on steric hindrance ethene bridge and an LC material at a mass ratio of 1:200 to 1:18.

The LC material may be a nematic LC, a chiral LC, a smectic thermotropic LC, or a mixture of lamellar and columnar lyotropic LCs, and the chiral LC includes, but is not limited to, a cholesteric chiral LC or a blue phase chiral LC.

The anti-counterfeiting material may have at least dual anti-counterfeiting functions, and the optical information encoding may realize multiple input and output signals.

The present disclosure provides a multi-stable and erasable anti-counterfeiting technology with controlled reflection color and the application thereof in optical coding, which rely on a mixture of an intrinsic chiral diarylethene compound based on steric hindrance ethene bridge and an LC material, and the intrinsic chiral diarylethene molecule based on steric hindrance ethene bridge shows the following structure formula as 1o:

the intrinsic chiral diarylethene compound based on steric hindrance ethene bridge and an LC material at a mass ratio of 1:200 to 1:18.

Preferably, the LC material may be a nematic LC, a chiral LC, a smectic LC, a thermotropic LC, or a mixture of lamellar and columnar lyotropic LCs.

Preferably, the optical information encoding function may realize the multi-channel encoding of light with any wavelength of 450 nm to 680 nm.

The present disclosure provides a dual erasable material system with continuous and controllable reflection color, which is composed of the intrinsic chiral diarylethene compound based on steric hindrance ethene bridge and an LC material. The intrinsic chiral diarylethene molecule based on steric hindrance ethene bridge shows the following structure formula as 1o:

the intrinsic chiral diarylethene compound based on steric hindrance ethene bridge and an LC material are at a mass ratio of 1:200 to 1:18.

Preferably, the LC material may be a nematic LC, a chiral LC, a smectic LC, a thermotropic LC, or a mixture of lamellar and columnar lyotropic LCs.

The present disclosure provides use of the material system according to the above technical solution as an anti-counterfeiting material or in the field of optical information encoding.

Preferably, the anti-counterfeiting material may be prepared by mixing the intrinsic chiral diarylethene compound based on steric hindrance ethene bridge and an LC material and encapsulating the obtained LC mixture in an LC cell.

Preferably, the cell may include a second substrate, a second alignment layer, an LC mixture layer, a first alignment layer, and a first substrate in order from bottom to top.

Preferably, the first substrate and/or the second substrate may be glass substrates or flexible film substrates; the first and second alignment layers may be polyimide (PI) films or photosensitive molecular films with a thickness of 1 μm to 2 μm.

Preferably, the LC mixture layer may be prepared by mixing the intrinsic chiral diarylethene compound based on steric hindrance ethene bridge and an LC material at a mass ratio of 1:200 to 1:18 with a thickness of 4 μm to 12 μm.

Preferably, the optical information encoding function may realize the multi-channel encoding of light with any wavelength of 450 nm to 680 nm.

The present disclosure provides an anti-counterfeiting material, which is prepared by encapsulating the dual erasable material system with continuous and controllable reflection color according to the above technical solution in a cell.

Preferably, the cell may include a second substrate, a second alignment layer, an LC mixture layer, a first alignment layer, and a first substrate in order from bottom to top.

Preferably, the first substrate and/or the second substrate may be glass substrates or flexible film substrates; the first and second alignment layers may be PI films or photosensitive molecular films with a thickness of 1 μm to 2 μm.

In the present disclosure, an intrinsic chiral diarylethene compound based on steric hindrance ethene bridge is mixed with an LC material to obtain an LC mixture, and the prepared LC mixture is injected into a cell, which can be irradiated by different light sources (such as ultraviolet light and visible light). It also can be irradiated by infrared light through adding with a small amount of up-conversion material (such as core-shell nanoparticles). The Bragg reflection color of LC (the central wavelength of the spectral reflection band) undergoes reversible transformations of the Bragg reflection band during the entire irradiation process with a wide reversible dynamic spectral range and diverse color changes. When radiation is conducted with light of a specified band, the reflection color corresponds to a specified radiation dosage, and the color transformation rate is proportional to a specified radiation intensity. After the light source is removed, the position of the central wavelength can remain unchanged in any intermediate state for a long period of time, exhibiting prominent stability and multi-stable control.

The cell may include a second substrate, a second alignment layer, an LC mixture layer, a first alignment layer, and a first substrate from bottom to top, which can be purchased from a manufacturer or self-manufactured.

The first and/or second substrates may be glass substrates or flexible film substrates, such as plastic film, paperboard, wood, cloth, metal, inorganic film, transparent polymer material, or other optically transparent materials.

The first and second alignment layers may be PI films or photosensitive molecular films with a thickness of 1 μm to 2 μm.

The LC mixture layer may be prepared by mixing the intrinsic chiral diarylethene compound based on steric hindrance ethene bridge and an LC material at a mass ratio of 1:200 to 1:18 with a thickness of 4 μm to 12 μm.

The spectral range of the stimulation light source may include: ultraviolet light, including but not limited to any band within 310 nm to 400 nm; visible light, including but not limited to any band within 450 nm to 570 nm, where, sunlight or white-light LEDs can also be used as excitation light sources; and infrared light, including but not limited to any band within 780 nm to 1,000 nm, where, an infrared band driving system needs to be added with a small amount of an up-conversion material, such as core-shell nanoparticles. Moreover, sunlight or white-light LEDs can also be used as stimulation light sources.

The reversible transformation of the LC Bragg reflection color caused by the radiation of different light sources can be adjusted repeatedly, and the transformation rates of the reflection central wavelength and reflection color are not significantly changed, exhibiting robust fatigue resistance.

The anti-counterfeiting material of the present disclosure may be prepared by mixing the intrinsic chiral diarylethene compound based on steric hindrance ethene bridge and an LC material. The LC mixture material has multiple anti-counterfeiting functions. An anti-counterfeiting element made by roll-to-roll printing, printing, pattern splicing or other technologies shows Bragg reflection color response to different light sources. The anti-counterfeiting material controls the change in contrasts of pattern reflection color and background color through the same excitation light band and the different radiation dosages, or the different excitation light bands and the same radiation dosage, or the different excitation light bands and the different radiation dosages to realize the appearance, disappearance, and the color and corresponding spectrum changes of characters or patterns, thereby achieving dual erasable anti-counterfeiting.

The optical information encoding material of the present disclosure may be prepared by mixing the intrinsic chiral diarylethene compound based on steric hindrance ethene bridge and an LC material. The LC mixture material has multiple input and output signal functions. The optical encoding based on the stimulation of light radiation dosages at different wavelengths as input signals, generating different reflection band regions as output signals, thereby realizing multiple input and output signal functions.

By adopting the foregoing technical solutions, the present disclosure achieves the following advantages and beneficial effects.

The anti-counterfeiting and encoding materials of the present disclosure that include a mixture system of a diarylethene compound based on steric hindrance ethene bridge and an LC material have the following advantages: large helical twisting power (HTP) and wide light-induced variation range, which ensures the diversification of reflection color and is the key to the realization of secondary anti-counterfeiting and multiple output signal functions; high thermal stability, where, a pattern appearing under irradiation with ultraviolet light can exist stably for a relatively-long period of time after the stimulation light source is removed, therefore achieving multistable light control to inspection and observation and ensuring the stable output of encoded information, which cannot be achieved by traditional azo, spiropyran and other materials. The robust fatigue resistance, where, the authenticity of commodities can be inspected repeatedly by irradiation with ultraviolet and visible light, which can achieve repeated input and output, greatly increasing the service life of the optical encoding material; and simple preparation process and low raw material cost.

The anti-counterfeiting and optical encoding materials of the present disclosure that include a mixture system of the intrinsic chiral diarylethene compound based on steric hindrance ethene bridge and an LC material, and the anti-counterfeiting and encoding functions are achieved by adjusting the Bragg reflection color of the LC system. The intrinsic chiral diarylethene compound based on steric hindrance ethene bridge of the present disclosure can undergo photocyclization and cycloreversion under irradiation of light, resulting in a wide range of adjustment for HTP. The intrinsic chiral diarylethene compound based on steric hindrance ethene bridge of the present disclosure is mixed with a nematic LC, a chiral LC (including, but not limited to, cholesteric and blue phase chiral LCs), smectic and other thermotropic LCs, or lamellar and columnar lyotropic LCs at a specified ratio to obtain an LC mixture, and then the LC mixture is injected into an LC cell, where, precise control of the reflection color in the full-visible light region can be achieved through irradiation of light. The anti-counterfeiting and optical encoding material systems of the present disclosure can be prepared by a simple process from cheap raw materials, achieving a wide spectral range, high thermal stability, robust fatigue resistance and multistable light control functions, which is expected to be further used in the fields of anti-counterfeiting and optical encoding.

The mixture system of the intrinsic chiral diarylethene compound based on steric hindrance ethene bridge and an LC of the present disclosure needs simple preparation and low raw material cost, and exhibits prominent photosensitivity, high stability, robust fatigue resistance, and large change in light-induced HTP. The mixing of the compound with the LC material can achieve precise control of the LC Bragg reflection color and the appearance or hiding of a corresponding pattern through the light irradiation with specific wavelength, so as to realize the primary anti-counterfeiting function. Further, more precise dual erasable anti-counterfeiting is achieved through the established corresponding relationship between the LC Bragg reflection band and the radiation dosage of light source. Moreover, the light radiation dosages at different wavelengths serve as input signals and different reflection band regions serve as output signals, thereby realizing multiple input and output signal functions.

The mixture system of the intrinsic chiral diarylethene compound based on steric hindrance ethene bridge and an LC of the present disclosure has the characteristics of high stability, robust fatigue resistance, and wide-range controllable HTP, which can be used for dual erasable anti-counterfeiting and optical information encoding technologies.

DETAILED DESCRIPTION

The raw materials used in the present disclosure can be prepared according to methods in references (Angew. Chem. Int. Ed. 2014, 53, 4603-4607), reagents and raw materials are commercially available. Shijiazhuang Chengzhi Yonghua Display Material Co., Ltd.: E7, with a clearing point of 59° C. Taihu Rootin photoelectric display Co., Ltd.: cell, with a size of 15.13 mm×21 mm and a thickness of 5 μm.

In the present disclosure, an intrinsic chiral diarylethene compound based on steric hindrance ethene bridge is mixed with an LC material to obtain an LC mixture, and the prepared LC mixture is encapsulated into an cell, which can be irradiated by different light sources (such as ultraviolet light and visible light). It also can be irradiated by infrared light through adding with a small amount of up-conversion material (such as core-shell nanoparticles). The Bragg reflection color of LC (the central wavelength of the spectral reflection band) undergoes reversible transformations among different bands during the entire irradiation process with a wide reversible dynamic spectral range and diverse color changes. Moreover, the reflection color is corresponded to a specified radiation dosage, in other word, the color transformation rate is proportional to a specified radiated intensity. After the light source is removed, the position of the central wavelength can remain unchanged in any intermediate state for a long period of time, exhibiting prominent stability and multistable control. Moreover, the light radiation dosages at different wavelengths serve as input signals and different reflection band regions serve as output signals, which can realize multiple input and output signal functions.

In the present disclosure, the cell may preferably include a second substrate, a second alignment layer, an LC mixture layer, a first alignment layer, and a first substrate from bottom to top, which can be purchased from a manufacturer or self-manufactured.

In the present disclosure, the first and/or second substrates may preferably be glass substrates or flexible film substrates independently, specifically, such as plastic film, paperboard, wood, cloth, metal, inorganic film, transparent polymer material, or other optically transparent materials.

In the present disclosure, the first and second alignment layers may preferably be PI films, and the first and second alignment layers may independently have a thickness preferably of 1 μm to 2 μm.

The LC mixture layer may be prepared by mixing the intrinsic chiral diarylethene compound based on steric hindrance ethene bridge into an LC material at a mass ratio of 1:200 to 1:18 with a thickness of 4 μm to 12 μm.

In the present disclosure, the spectral range of the light source may include: ultraviolet light, including but not limited to any wavelength within 310 nm to 400 nm; visible light, including but not limited to any wavelength within 450 nm to 570 nm; and infrared light, including but not limited to any wavelength within 780 nm to 1,000 nm, where, an infrared band driving system needs to be added with a small amount of an up-conversion material, such as core-shell nanoparticles. Moreover, sunlight or white-light LEDs can also be used as light sources.

In the present disclosure, the reversible transformation of the LC Bragg reflection color among different bands caused by the radiation of different light sources can be adjusted repeatedly, and the transformation rates of the reflection central wavelength and reflection color under light irradiation and radiation dosage are not significantly changed, exhibiting robust fatigue resistance.

The anti-counterfeiting material of the present disclosure may be prepared by mixing the intrinsic chiral diarylethene compound based on steric hindrance ethene bridge with an LC material. The LC mixture material has multiple anti-counterfeiting functions. An anti-counterfeiting element made by roll-to-roll printing, printing, pattern splicing or other technologies shows Bragg reflection color response to different light sources. The anti-counterfeiting material controls the change in contrasts of pattern reflection color and background color through the same excitation light band and the different radiation dosages, or the different excitation light bands and the same radiation dosage, or the different excitation light bands and the different radiation dosages to realize the appearance, disappearance, and corresponding spectrum changes of characters or patterns, thereby achieving dual erasable anti-counterfeiting.

The optical encoding material of the disclosure presented herein may be prepared by mixing the intrinsic chiral diarylethene compound based on steric hindrance ethene bridge into an LC material. The LC mixture material has multiple input and output signal functions. The optical information encoding light radiation dosages at different wavelengths as input signals and different reflection band regions as output signals, thereby realizing multiple input and output signal functions.

Figure 1:
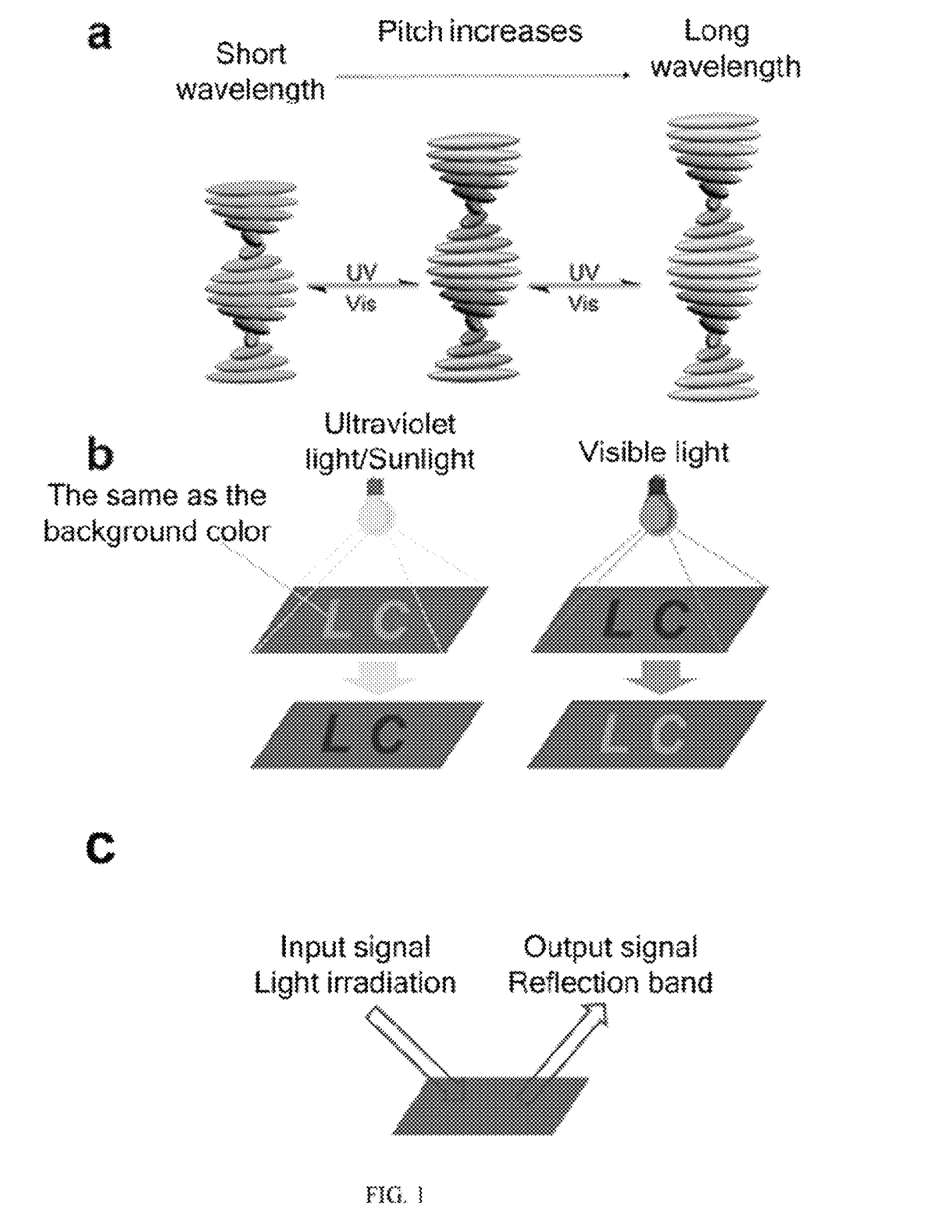
FIG. 1 is a schematic diagram of the principle of anti-counterfeiting and information encoding.

Description of the anti-counterfeiting principle in the application embodiment: The compound 1o is mixed with the commercial ordinary nematic LC E7 (purchased from Shijiazhuang Chengzhi Yonghua Display Material Co., Ltd.) to obtain LC mixture (the mixing ratio is described in the following specific embodiment), and then the LC mixture is arranged in the area of the "LC" character in the middle of a blue substrate, where, the specific mixing ratio allows the Bragg reflection color of the LC mixture to be also blue. When the substrate is irradiated with ultraviolet light (310 nm to 400 nm) (the distance between the light source and the sample is kept within 30 cm), the initial reflection color of the area exhibiting "LC" character (observed under indoor light or sunlight, generally, white light) is blue, the pitch of the helical structure in the LC area gradually increases (FIG. 1a). The Bragg reflection color gradually undergoes red-shift, at which time, the "LC" character gradually appears on the substrate; and then the substrate is irradiated with visible light (450 nm to 570 nm), the pitch in the LC area gradually decreases, and the Bragg reflection color gradually undergoes blue-shift, at which time, the color of the "LC" character on the substrate is the same as the background color, so that the "LC" character is hidden (FIG. 1b), thus achieving the anti-counterfeiting purpose.

Description of the optical information encoding principle in the application embodiment: The compound 1o is mixed with the commercial ordinary nematic LC E7 (purchased from Shijiazhuang Chengzhi Yonghua Display Material Co., Ltd.) to obtain an LC mixture (the mixing ratio is described in the following specific embodiment), and then the LC mixture is arranged on a blue substrate, where, the specific mixing ratio allows the Bragg reflection color of the LC mixture to be blue. When irradiations with ultraviolet light (310 nm to 400 nm) for different periods of time serve as input modulation signals (the distance between the light source and the sample is kept within 30 cm), the initial reflection color of the LC on the substrate (observed under indoor light or sunlight, generally, white light) is blue, the helical structures corresponding to different input signals have different pitches (FIG. 1a), and Bragg reflection colors are also different; when light with a wavelength in the reflection band serves as an input signal (such as blue light), the light is reflected at the initial state (namely, state "1"); and ultraviolet light irradiation increases the pitch of LC (FIG. 1c), and the reflection band is red-shifted to another band, which makes blue light fail to be reflected (namely, state "0"), thus achieving the information encoding of blue light. Similarly, when the band is red-shifted to another position, such as green light or red light, the information encoding can also be conducted for light with the corresponding wavelength, thereby realizing the optical encoding of multi-wavelength channels.

The present disclosure is further described below with reference to the accompanying drawings and embodiments.

Application Embodiment 1

Mixing of a compound with LC: 2.0 mg of compound 1o and 38.0 mg of commercial ordinary nematic LC E7 were mixed to obtain an LC mixture.

Figure 2:
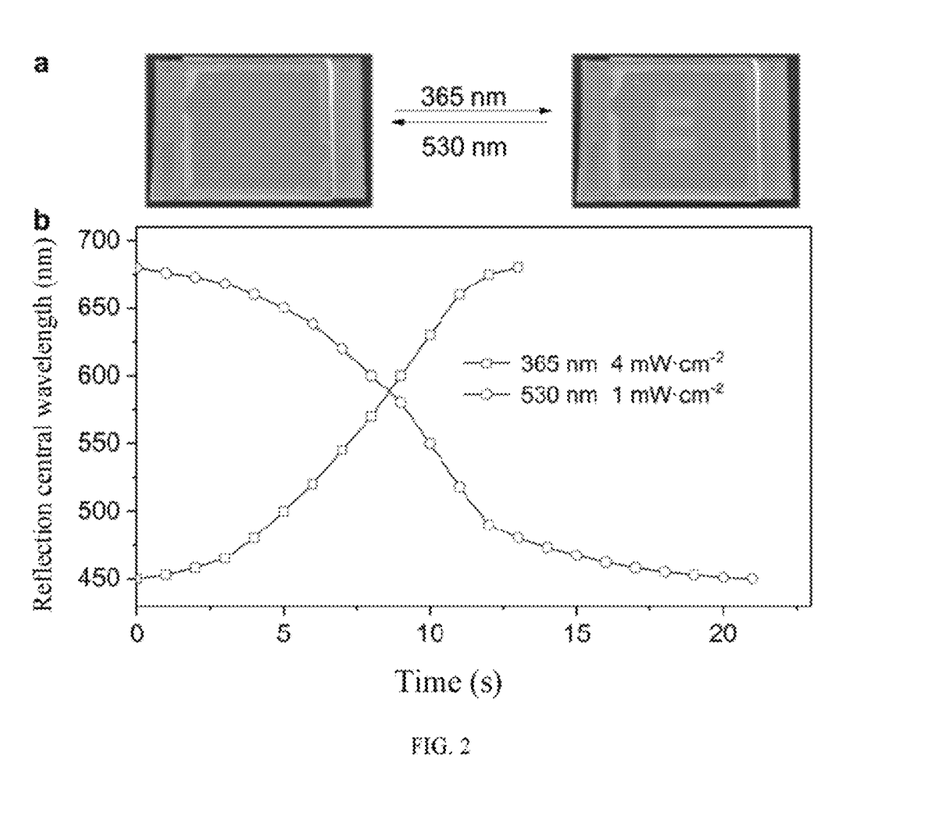
FIG. 2 is a schematic diagram of dual erasable anti-counterfeiting of the system in Application Embodiment 1 of the present disclosure.

Description of primary anti-counterfeiting: The above LC mixture was filled into a 5 μm oriented cell (purchased from Taihu Rootin photoelectric display Co., Ltd.), and a character "E" mask was arranged in the middle area (only the character "E" area was transparent, and the rest part is completely opaque), as shown in FIG. 2, the initial reflection color of the LC area (observed under indoor light or sunlight, generally, white light) was blue at the beginning, and when the surface of the cell was irradiated with ultraviolet light (365 nm) (the distance between the light source and the sample is maintained within 30 cm), the pitch of the LC in the transparent area (character "E") increased. The Bragg reflection wavelength of the entire LC system was red-shifted with the increase of the pitch according to Bragg equation, and the character "E" became green, so that green character "E" appeared under the blue background. On the contrary, when the green character "E" was irradiated with visible light (530 nm), the green character "E" gradually became blue, which was consistent with the background blue, so that the green character "E" was hidden, thus realizing the primary anti-counterfeiting function.

Description of secondary anti-counterfeiting: based on the primary anti-counterfeiting, the Bragg reflection central wavelength corresponding to the above LC area would change over time under the influence of an irradiation light source. Due to high thermal stability and robust fatigue resistance, the material can not only achieve multi-stable light control, but also realize repeated monitoring and confirmation of the central wavelength, bandwidth, and shape of the spectrum at the intermediate state of light. The Bragg reflection central wavelengths under different irradiation times of the irradiation light source were recorded to plot a graph illustrating the relationship between the Bragg reflection central wavelength and the irradiation time. As shown in FIG. 2b, when the cell was irradiated with ultraviolet light (365 nm, 4 mW·cm$^{-2}$), the Bragg reflection central wavelength gradually increased (450 nm to 680 nm) with the increase of irradiation time, and there was a one-to-one correspondence between the irradiation time and the Bragg reflection central wavelength, so the Bragg reflection central wavelength could be determined according to the irradiation time. Similarly, when the cell was irradiated with visible light (530 nm, 1 mW·cm$^{-2}$), the Bragg reflection central wavelength gradually decreased with the increase of irradiation time, and there was also a one-to-one correspondence between the irradiation time and the Bragg reflection central wavelength, so the Bragg reflection central wavelength could also be determined according to the irradiation time. Therefore, precise secondary anti-counterfeiting can be further achieved according to the correspondence between the radiation dosage (namely, power multiplied by irradiation time) and the Bragg reflection central wavelength.

Application Embodiment 2

Mixing of a compound with LC: 2.0 mg of compound 1o and 38.0 mg of commercial ordinary nematic LC E7 were mixed thoroughly to obtain an LC mixture.

Figure 3:
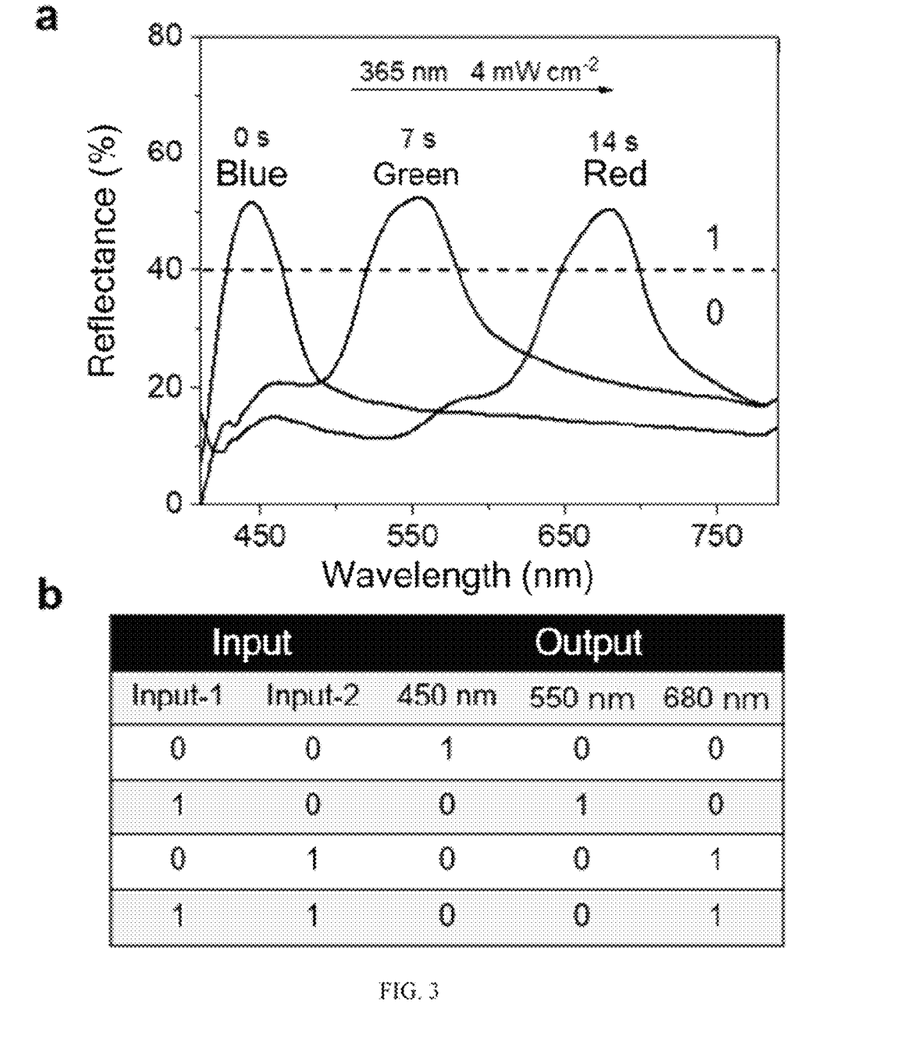
FIG. 3 is a schematic diagram of optical information encoding of the system in Application Embodiment 2 of the present disclosure.

Description of optical information encoding: The above LC mixture was filled into a 5 μm oriented cell (purchased from Taihu Rootin photoelectric display Co., Ltd.). As shown in FIG. 3, at the beginning, the initial reflection color of the LC area (observed under indoor light or sunlight, generally, white light) was blue, and when the surface of the cell was irradiated with ultraviolet light (365 nm, 4 mW·cm$^{-2}$), with the distance between the light source and the sample being kept within 30 cm, the pitch of the LC area increased, and according to Bragg equation, the Bragg reflection wavelength of the entire LC system was red-shifted with the increase of the pitch. It can be seen from the corresponding reflection wavelength (FIG. 3a) that, when the light irradiation was conducted for 7 s, the reflection wavelength was about 550 nm, and when the light irradiation was conducted for 14 s, the reflection wavelength was about 680 nm. According to this property, irradiation with ultraviolet light (365 nm, 4 mW·cm$^{-2}$) for 7 s was used as input channel 1 "Input-1", and irradiation with ultraviolet light (365 nm, 4 mW·cm$^{-2}$) for 14 s was used as input channel 2 "Input-2", where, it was recorded as "1" when there was input and it was recorded as "0" when there was no input; and the reflection wavelengths of 450 nm, 550 nm, and 680 nm were regarded as three outputs, separately. It was recorded as "1" when the reflectance was higher than 40% and it was recorded as "0" when the reflectance was lower than 40%. Therefore, a code table of multiple inputs and outputs could be obtained, as shown in FIG. 3b. When Input-1 and Input-2 were both "0", namely, the LC mixture of the initial state, the reflection band was mainly 450 nm, so the output result was only 450 nm, that is, 450 nm output was "1", and 550 nm and 680 n m were both "0". When Input-1 was "1" and Input-2 was "0", namely, the LC mixture of the initial state was irradiated with light (365 nm, 4 mW·cm$^{-2}$) for 7 s, the reflection band was mainly 550 nm, so the output was only 550 nm, that is, 550 nm output was "1", and 450 nm and 680 nm were both "0". Similarly, when Input-1 was "0" and Input-2 was "1", namely, the LC mixture of the initial state was irradiated with light (365 nm, 4 mW·cm$^{-2}$) for 14 s, the reflection band was mainly 680 nm, so the output result was only 680 nm, that is, 680 nm output was "1", and 450 nm and 550 nm were both "0". When Input-1 and Input-2 were both "1", namely, the LC mixture of the initial state was irradiated with light (365 nm, 4 mW·cm$_{-2}$) for 21 s, at which time, the LC system reached a photostationary state under ultraviolet light irradiation, the reflection band was mainly 680 nm, so the output result was only 680 nm, that is, 680 nm output was "1", and 450 nm and 550 nm were both "0". Based on the above results, an optical encoding system with multiple inputs and outputs can be realized.

The above description of embodiments is merely provided to help illustrate the method of the present disclosure and a core idea thereof. It should be noted that several improvements and modifications may be made by persons of ordinary skill in the art without departing from the principle of the present disclosure, and these improvements and modifications should also fall within the protection scope of the present disclosure. Various modifications to these embodiments are readily apparent to persons skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

What is claimed is:

1. A use method of a dual erasable material system with continuous and controllable reflection color as an anti-counterfeiting material or in the field of optical information encoding, the dual erasable material system being composed of an intrinsic chiral diarylethene compound based on steric hindrance ethene bridge and a liquid crystal (LC) material, the intrinsic chiral diarylethene compound based on steric hindrance ethene bridge having a structure shown in formula 1o:

formula 1o and a mass ratio of the intrinsic chiral diarylethene compound based on steric hindrance ethene bridge to the LC material being in a range of 1:200 to 1:18; and the LC material being a nematic LC, a chiral LC, a smectic LC, a thermotropic LC, or a mixture of lamellar and columnar lyotropic LCs;

the use method comprising:

mixing the intrinsic chiral diarylethene compound based on steric hindrance ethene bridge and the LC material to obtain an LC mixture, and injecting the LC mixture in a cell to obtain the anti-counterfeiting material or a target material with optical information encoding function, wherein the optical information encoding function refers to realizing multi-channel encoding of light with any wavelength of 450 nm to 680 nm; and the anti-counterfeiting material undergoes reversible dual anti-counterfeiting at least twice.

2. The use method according to claim 1, wherein, the cell comprises a second substrate, a second alignment layer, an LC mixture layer, a first alignment layer, and a first substrate in order from bottom to top.

3. The use method according to claim 2, wherein, at least one of the first substrate and the second substrate is one selected from the group consisting of glass substrates, plastic film, paperboard, wood substrates, cloth, and metal substrates; and the first and second alignment layers are polyimide (PI) films with a thickness of 1 μm to 2 μm.

4. The use method according to claim 2, wherein, the LC mixture layer is prepared by mixing the intrinsic chiral diarylethene compound based on steric hindrance ethene bridge and an LC material at a mass ratio of 1:200 to 1:18 with a thickness of 4 μm to 12 μm.

* * * * *